Figure 1:
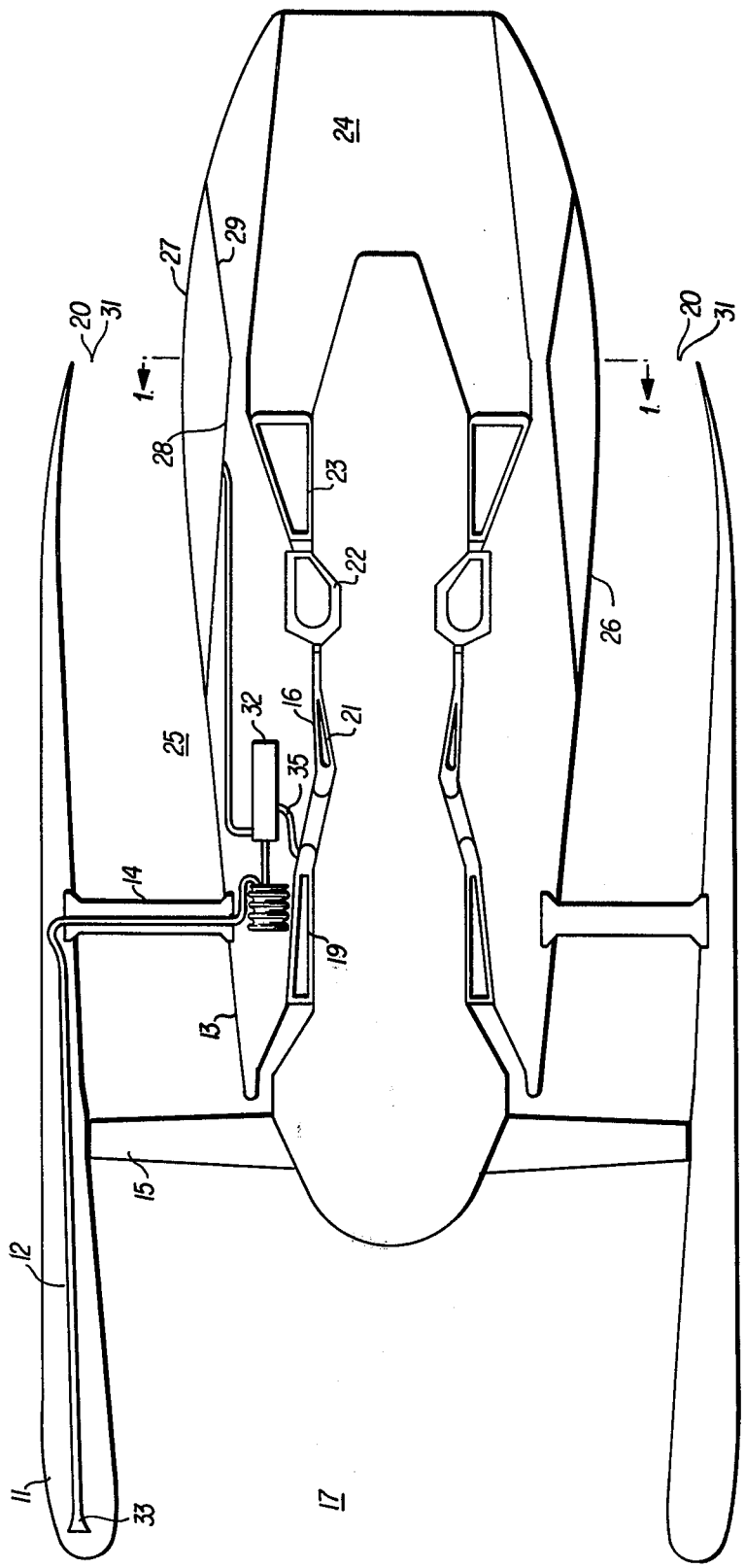

United States Patent [19]

McMurtry

[11] 3,967,443
[45] July 6, 1976

[54] TURBOFAN ENGINE WITH FLEXIBLE, VARIABLE AREA NOZZLE

[75] Inventor: Davis Roberts McMurtry, Bristol, England

[73] Assignee: Rolls-Royce (1971) Limited, London, England

[22] Filed: Feb. 21, 1975

[21] Appl. No.: 551,980

Related U.S. Application Data

[62] Division of Ser. No. 352,921, April 20, 1973, Pat. No. 3,913,626.

[30] Foreign Application Priority Data

Apr. 27, 1972 United Kingdom............... 19605/72

[52] U.S. Cl................................. 60/226 R; 60/271
[51] Int. Cl.² ...................... F02K 1/10; F02K 3/06
[58] Field of Search.................. 137/625.69; 138/37, 138/42, 46; 251/5, 305; 239/265.43, 534; 60/226 R, 226 A, 230, 271

[56] References Cited
UNITED STATES PATENTS

| | | |
|---|---|---|
| 2,623,352 | 12/1952 | Sedille et al. .......................... 60/242 |
| 2,629,569 | 2/1953 | Andrews ............................... 60/242 |
| 3,258,913 | 7/1966 | Moorehead..................... 239/265.43 |
| 3,279,192 | 10/1966 | Hull et al. ............................. 60/271 |
| 3,380,663 | 4/1968 | Jumelle........................... 239/265.43 |
| 3,729,934 | 5/1973 | Denning et al.................... 60/226 R |
| 3,756,026 | 9/1973 | Timms et al. ................... 239/265.43 |

*Primary Examiner*—C. J. Husar
*Assistant Examiner*—Robert E. Garrett
*Attorney, Agent, or Firm*—Stevens, Davis, Miller & Mosher

[57] ABSTRACT

A fluid flow duct of a gas turbine engine, the duct being defined between a fan cowl and a centerbody and there being provided movable flexible members attached to the centerbody, each member being movable within the duct by fluid pressure between a first concave position and a second convex position for varying the cross-sectional flow area of the duct.

5 Claims, 5 Drawing Figures

U.S. Patent  July 6, 1976  Sheet 2 of 3  3,967,443

TURBOFAN ENGINE WITH FLEXIBLE, VARIABLE AREA NOZZLE

This is a division of application Ser. No. 352,921 filed Apr. 20, 1973, and now U.S. Pat. No. 3,913,626.

This invention relates to fluid flow ducts. It is sometimes desirable to alter the cross-sectional fluid flow area of a duct. For example, to match the operating characteristics of a ducted fan gas turbine engine to the flight envelope of an aircraft in which it is installed it is desirable to be able to alter the cross-sectional area of the nozzle at the downstream end of the duct. It is known to use inflatable elastic members to vary the flow area of a duct, but in prior proposals the members were stretched in their operative positions and thus subject to fatigue.

According to this invention, however, a fluid flow duct comprises at least one wall defining the duct, a flexible sheet material member attached to the wall and means for changing the shape of the member between a first convex position and a second concave position for varying the cross-sectional flow area of the duct, wherein in said concave position the member lies in a recess in said wall, and both positions constitute unstretched positions of the member.

The fluid flow duct may be a fan duct of a ducted fan gas turbine engine comprising a fan cowl defining a radially outer duct wall, a centrebody defining a radially inner duct wall, a member attached to the centrebody and means for changing the shape of the member between a first, convex position and a second, concave position.

Preferably in the convex position the member follows the general shape of the centrebody, and in the concave position the member adapts the shape of the recess.

The member is preferably made in a flexible material and the first and second positions correspond to natural unstretched states of the member.

There may be a plurality of members attached to the centrebody and disposed, some in the first and some in the second position.

The ducted fan gas turbine engine may be of the variable pitch fan type, and the fan cowl, and one or more members attached to the centrebody may be so arranged that together they form a nozzle at one end of the duct.

The cross-sectional flow area of the nozzle may be altered according to the position of each of the members.

The nozzle may act as an intake when used with a variable pitch fan gas turbine engine operating in the reversed pitch mode.

Figure 2:
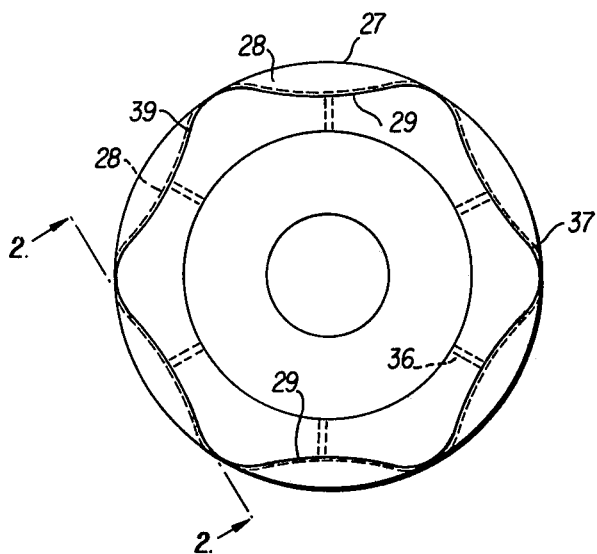
Figure 3:
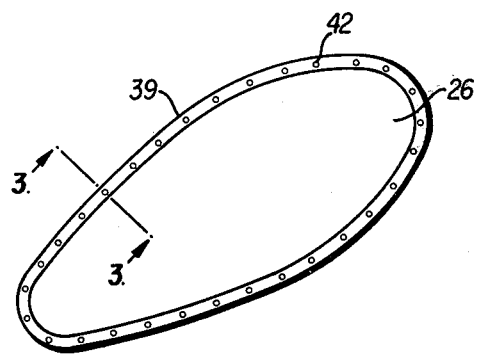
Figure 4:
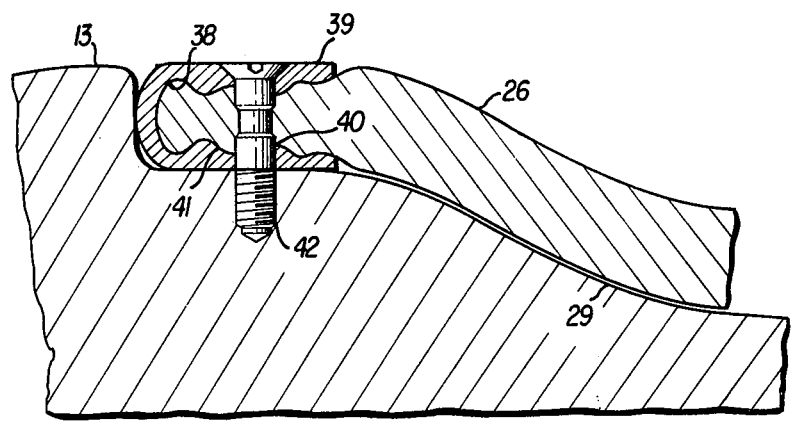
Figure 5:
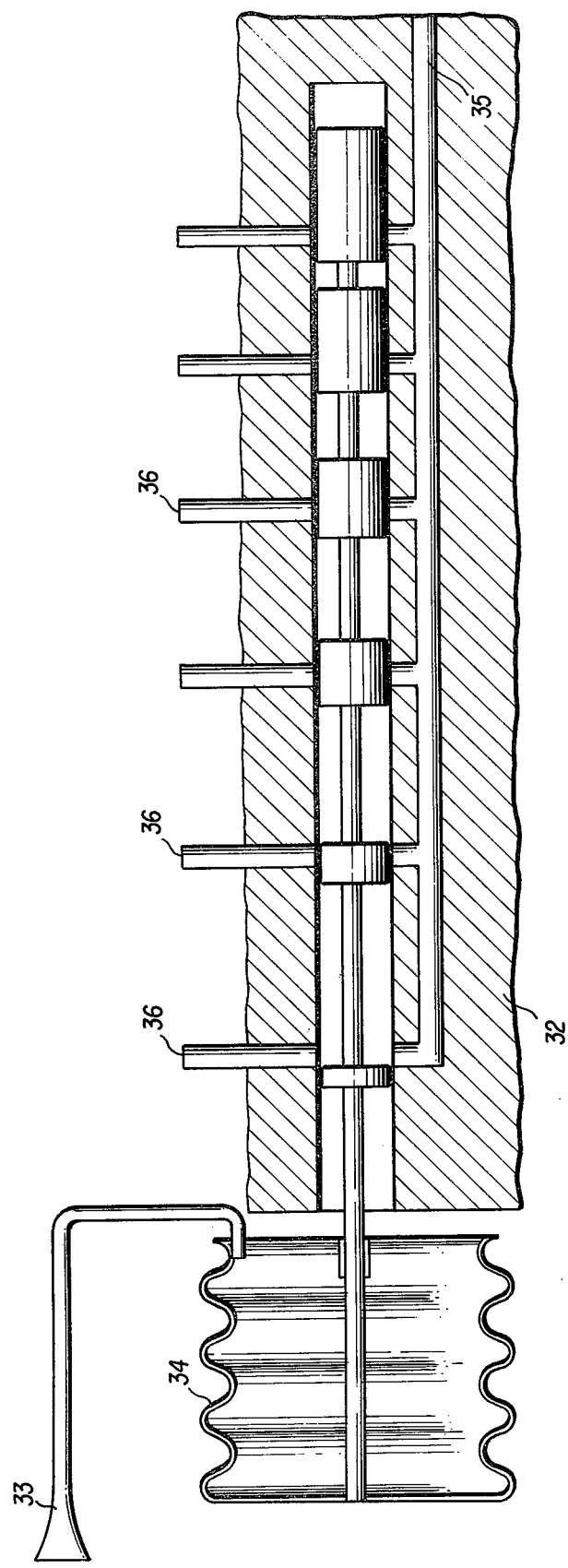

A specific embodiment of the invention will now be described with reference to the accompanying drawings wherein:

FIG. 1 is a longitudinal section through a gas turbine engine, including the duct of the present invention, FIG. 2 is a view on the line I—I of FIG. 1, FIG. 3 is a view on the line II—II of FIG. 2, FIG. 4 is an expanded detail of a section on the line III—III of FIG. 3, and FIG. 5 is a longitudinal section through a spool valve, for controlling the supply of compressed fluid to the members.

Referring now to the Figures, in FIG. 1 there is shown a front fan gas turbine engine 11 comprising an outer fan cowl 12 spaced from a centrebody 13 by struts 14 to define a fan duct. The cowl encloses a variable pitch fan 15 and a core engine 16 which is drivingly connected to the fan and is situated within the centrebody.

Such an engine may be used as a propulsion unit for an aircraft. In operation, with the fan in the forward pitch position, air enters an intake at 17, is compressed by the fan and delivered past a flow splitter 18 which divides the flow into two streams. A first stream flows through the core engine 16 in which it is further compressed by an intermediate compressor 19 and by a high pressure compressor 21, before entering a combustion chamber 22, where it is mixed with fuel and burned. The products of combustion flow through the several stages of a turbine 23 drivingly connected to the fan and the intermediate and high pressure compressors by shafts (not shown), and are then exhausted via the nozzle 24.

The second stream, which provides the main propulsive force from the engine, is delivered to atmosphere via the duct 25 and the nozzle 20 defined by the downstream end of the fan cowl 12 and the centrebody 13.

Referring now to FIGS. 1, 2 and 3, six flexible sheet material members 26 are mounted on the centrebody and secured to it at their edges. Each member is made of fibre-reinforced sheet rubber so that it is flexible but substantially inelastic, and is capable of being moved by means later described, between two positions including a first position 27 (shown in full lines in FIG. 1) in which it follows the general shape of the centrebody, and a second position 28 (shown in dotted lines) in which it lies flush with and is received in a recess which in this embodiment is in the form of a depression 29 in the centrebody. It will be understood that the recess may be merely a hole in the centrebody. In each of the positions 27, 28 the member is substantially unstretched from its natural state. This enables many movements of the member to be made between its two operating positions before the material from which it is made fatigues rendering it unserviceable. The contours of each recess in the centrebody are blended gradually into the centrebody, as at 37, to prevent large deflections of the member along its line of attachment to the centrebody. Attachment of the member to the centrebody, is shown in FIG. 4 and may be achieved by bonding the edge 35 of each member into a metal channel section 39, the channel section 39 having internal ribs 40 which co-operate with ribs 41 on the member for retention thereof. The member is connected to the centrebody by bolts 42.

The members 26 have been described as being constructed from fibre-reinforced rubber, in an analogous manner to a pneumatic tire carcass, but it will be appreciated that synthetic material or a sheet of metal could be used. In the case of a piece of sheet metal being used for the member 26 it would be formed by a pressing operation to produce for example, the shape of the member in the convex position. In operation the edge of the member is rigidly clamped by bolts 42. A force is applied perpendicular to the convex surface so that the sheet inverts into the concave position. The concave position is the mirror image of the convex position so that both positions correspond to natural unstretched positions of the member.

For the conditions encountered during take off of an aircraft in which the gas turbine engine described above is installed, it is desirable to have the maximum nozzle area available, and thus at take-off all six members would lie in the second position 28. As the forward speed of the aircraft increases, the nozzle area required progressively decreases and this may be achieved by applying pressurized air to the underside of each of the members 26 in turn so as to move sequentially each member to the first position 27. It is preferably to have at least six members otherwise the sudden decrease in nozzle area as each member is sequentially moved to the first position may cause too sudden a pressure change in the duct 25 resulting in surging of the engine.

At cruise conditions the nozzle area required will be at a minimum and thus all six members will be in the first position 27.

For landing of the aircraft it is desirable to reverse the direction of thrust from the engines to achieve a braking effect. For this the pitch of the fan blades is reversed and the nozzle 20 of the duct 25 must act as the intake 31 to the fan, and a larger cross-sectional flow area is required than for the cruise condition. The larger flow area is achieved by moving the members 26 sequentially back to the second position 28 as the forward speed of the aircraft falls prior to landing.

The members 26 are moved between the first and second positions by establishing a pressure differential across them. This is conveniently done using pressurized air from a compressor of the engine under the control of a spool valve 32 as shown in FIG. 5.

As the forward speed of the aircraft increases the Rayleigh pitot pressure, as sensed by a pitot tube 33, increases and this pressure is communicated to a resilient bellows 34 connected to the spool valve 32. Thus the degree of expansion of the bellows is proportional to the forward speed of the aircraft and the movement of the spool valve may be used sequentially to connect a source of relatively high pressure air 35, for example bleed air from the I.P. (intermediate pressure) compressor 19, to galleries 36, each gallery connecting with one of the depressions 29 in the centrebody.

When the forward speed of the aircraft, and hence the pitot pressure, falls the spool valve 32 moves to the left and resets itself as the resilient bellows 34 recover their natural shape. A second spool valve, not shown but otherwise identical to the first spool valve, working in reverse may be used sequentially to vent the pressure in each of the galleries 36. The duct pressure will be sufficiently high to move each member 26 to the second position 28 once each gallery 36 has been vented.

It is preferred that for use in a gas turbine engine the members are attached to the centrebody rather than to the fan cowl, as attachment to the fan cowl could result in a performance penalty due to increased base drag. It will however, be understood that in either applications of the invention for varying the flow area of a duct there may be no objection to attaching the members to the radially outer duct wall, indeed in some applications there may of course be no centrebody or its equivalent.

I claim:

1. A gas turbine engine comprising: an engine casing and a centrebody comprising two walls defining therebetween a main discharge duct for propulsive gases; means for varying the flow area of said duct comprising a flexible flow area varying member, said member having only two operating positions; means for attaching said member to one of said two walls; fluid pressure means for changing the shape of said member between the two operation positions wherein the flow area of said duct is varied; and means defining a recess in said one wall for receiving said member in one of the two operating positions, said member being substantially unstretched in both the operating positions.

2. A gas turbine engine according to claim 1, and wherein said duct is the fan duct of a ducted fan gas turbine engine, said engine casing including a fan cowl defining a radially outer wall of said duct cut, said centrebody defining a radially inner wall of said duct, and in which said flow area varying member is attached to said centrebody.

3. A gas turbine engine according to claim 2, further comprising a plurality of recesses arranged around said centrebody, a plurality of flow area varying members, one for each of said recesses, and means for selectively moving each of said members between the two operating positions.

4. A gas turbine engine according to claim 2, wherein the engine is a variable pitch fan engine, and said fan cowl and centrebody together define a variable nozzle at one end of said fan duct, said nozzle acting as an intake for a fan operating in a reverse pitch mode.

5. A gas turbine engine according to claim 3, wherein the engine is mounted in an aircraft and includes a pitot tube, responsive to the forward speed of the aircraft, and a compressor supplying pressurized air, said means for selectively moving comprising a spool valve controlling the supply of pressurized air to each of said members from the compressor, said spool valve including means for supplying the pressurized air sequentially to each of said members in response to a Rayleigh pitot pressure sensed by the pitot tube.

* * * * *